Nov. 13, 1951     A. H. BENNETT     2,574,522
MICROSCOPE SLIDE FOR PHASE MICROSCOPES

Filed Jan. 28, 1946     2 SHEETS—SHEET 1

INVENTOR.
ALVA H. BENNETT
BY *Herbert C. Kimball*
ATTORNEY

Nov. 13, 1951 — A. H. BENNETT — 2,574,522
MICROSCOPE SLIDE FOR PHASE MICROSCOPES
Filed Jan. 28, 1946 — 2 SHEETS—SHEET 2

INVENTOR.
ALVA H. BENNETT
BY Herbert C Kimball
ATTORNEY

Patented Nov. 13, 1951

2,574,522

UNITED STATES PATENT OFFICE 2,574,522

MICROSCOPE SLIDE FOR PHASE MICROSCOPES

Alva H. Bennett, Kenmore, N. Y., assignor to American Optical Company, Southbridge, Mass., a voluntary association of Massachusetts Application January 28, 1946, Serial No. 643,851

4 Claims. (Cl. 88—40)

This invention relates to slides for use with a microscope, and particularly to such a device in which the field under observation appears to be subdivided by cross lines when observed under a microscope employing the principle known as "phase contrast."

In German Patent No. 636,168, patented in Germany November 26, 1932, is described a technique for increasing contrast in the image of an object where the light transmitted by the various portions of the object varies but little except in phase. These variations in phase are not normally perceptible to the human eye; and this German patent deals with the use of so-called "phase plates" for rendering these differences in the phase of the light coming from the various portions of the object under observation perceptible to the human eye. An object of the present invention is to cause the field observed in a microscope to appear to be subdivided by cross lines when employing the above mentioned technique of "phase contrast" in observing an object or material on a microscope slide, the transparency of the object or material requiring the aid of this technique known as "phase contrast" in order to be able to distinguish the structure or details thereof.

In accordance with the above mentioned technique of "phase contrast," a detail or a particle which is under observation may have so little variation in light absorption that without the "phase contrast" technique, it would be hardly perceptible; yet if the detail or particle varies in refractive index from its immediate surround, the use of this technique renders it distinct from its surround.

In accordance with an improvement of this technique, disclosed in co-pending application of Osterberg et al., Serial No. 456,726, filed August 28 1942, and issued September 23, 1947 as Patent No. 2,427,689, various shades of contrast can be obtained by resorting to a graded series of "phase plates"; and indeed the effect can be varied in such a way, by substituting various plates in the series, that particles or details which appear bright with one plate appear dark with another. The observer will wish to select that "phase plate" which affords the best conditions of contrast in the image for the particular observations he wishes to make.

In accordance with my invention, I cause such difference in optical path through the above-mentioned cross lines from the optical path through the field which these lines subdivide, as to give the desired contrast therebetween when the optimum "phase plate" is employed for observing an object supported on my improved slide.

For instance, in the examination of the contents of a sample of blood contained within a haemacytometer, it is difficult to count the platelets in the blood, those giant cells which originate in the marrow of bones of the body. By means of the "phase contrast" technique described in the above-mentioned German patent, these platelets can be distinguished and can be counted. The difference in optical path through these platelets as compared with the optical path through the liquid in which they are suspended provides the primary means for distinguishing and counting these platelets.

Another example of the application of the phase contrast technique is in the examination of a suspension of quartz particles in water. The counting of these quartz particles is ordinarily a difficult task, as their absorption varies little from that of the surrounding medium. The index of refraction of quartz is such that the optical path through these particles is not the same as the optical path through the same thickness of water, and as a result the light which has traversed a quartz particle it not in the same phase as light which has traversed the same thickness of water. If the proper "phase plate" is selected, these quartz particles can be discriminated clearly enough to be counted; and an object of my invention is to provide cross lines which also stand out in contrast to the background when this "phase plate" is used by the observer.

I will first describe a simple form of microscope equipped for the phase contrast technique and then the manner in which my invention may be applied to the production of a microscope slide such as a haemacytometer.

In the drawings:

Fig. 2 is a sectional view taken on line 2—2 of Fig. 1 looking in the direction of the arrows;

Fig. 3 is a sectional view taken on line 3—3 of Fig. 1 looking in the direction of the arrows;

This application is a continuation in part of my application Serial No. 500,507 for Optical Device filed August 30, 1943, and now abandoned.

Figure 1:
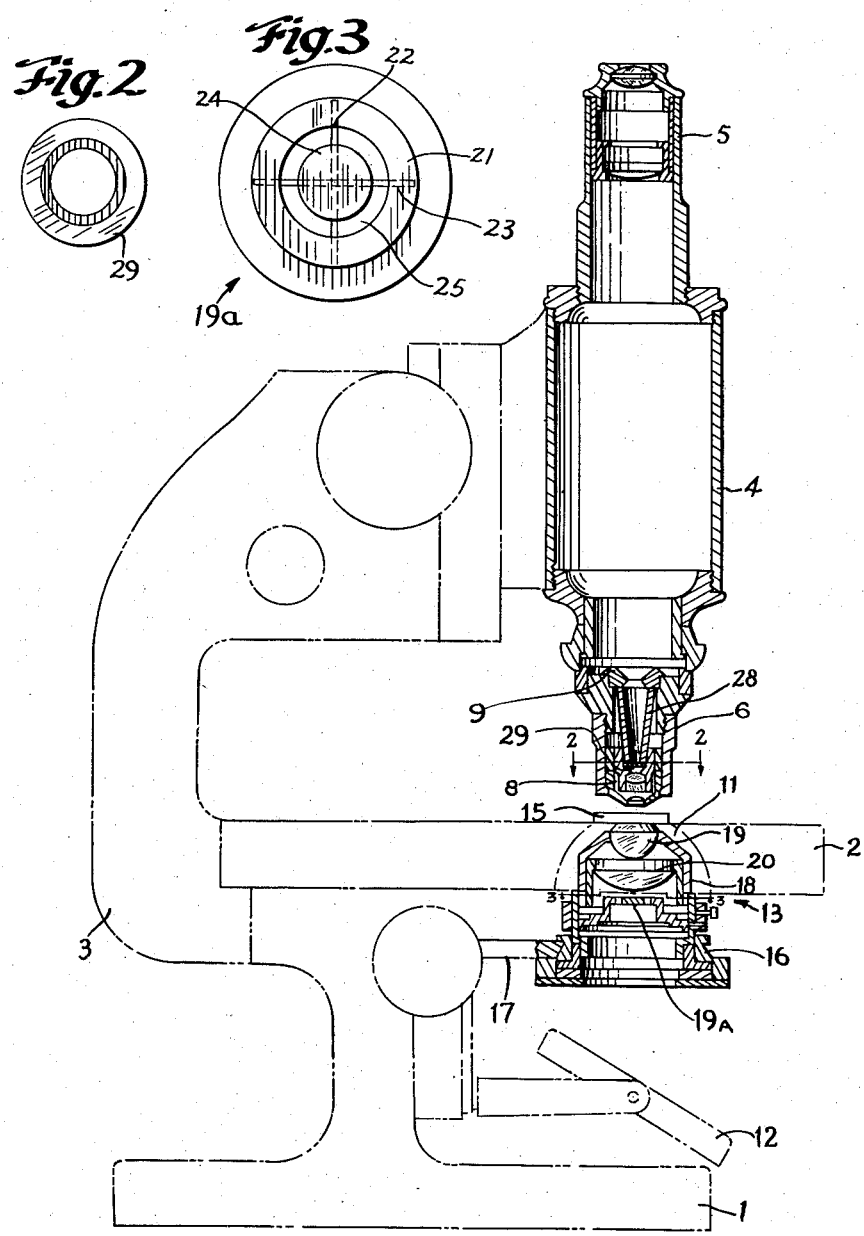
Fig. 1 is a side view, partly in section of a microscope adapted for phase contrast microscopy.

In Figs. 1, 2 and 3, I have illustrated a simple form of microscope equipped for the above referred to phase contrast technique. This microscope includes as is customary a base 1, a stage 2, an upright support 3, a body tube 4, an eyepiece 5 and an objective indicated in general by the numeral 6 for containing objective lenses 8 with which cooperates the usual diaphragm 9.

Through an opening 11 in the stage 2, light is reflected by the reflector 12, this light passing first through the condenser 13. After passing through the condenser, the light is directed through the opening 11 to illuminate the specimen or object on the slide 15 so that it may be observed by the microscopist.

A modified form of condenser aperture is employed, the mechanism therefor including a portion 16 engaging the usual support 17 for the condenser. As is customary, the support 17 is vertically adjustable to permit adjustment of the condenser 13 relative to the slide 15, this condenser including the lens rings or barrels 18 containing the usual condenser lenses 19 and 20.

A downward extension of the lens rings or barrels 18 is provided with bayonet slots to permit the accurate vertical adjustment of the ring aperture member 19a. This member 19a has the portion 21 to which are secured the ends of the cross wires 22 and 23 by solder or the like. The cross wires are secured adjacent their centers to the disc member 24 by solder or the like. In this way, the circular member 24 is supported in spaced relation with the member 21 to provide an annular or ring-shaped aperture 25 located at one of the above mentioned conjugate foci and which constitutes the entrance pupil of the microscope condenser and objective combined. The above mentioned structure of the condenser is described and claimed in said copending application Serial No. 456,726.

In carrying out the phase contrast technique, a phase plate 29, as hereinafter described, is used in cooperation with the above described arrangement of aperture or entrance pupil of the combined lens systems (condenser lenses and objective lenses). A series of these plates or discs 29 are made available as taught in said co-pending application Ser. No. 456,726 so as to provide the best contrast in the object being observed, which depends in part upon the difference in phase imparted to the light which is transmitted by the different portions of the object under observation. One method of forming these discs or plates is to form an annular deposit of di-electric material or absorbing material or both upon each of a series of discs of glass, the depth of deposit varying from disc to disc. In this way, a series of discs or plates is provided; and if desired each disc of the series will give a different phase change. From such a series, a plate 29 may be selected which provides, according to the phase contrast technique, the best contrast in the specimen under observation.

Within the objective 6 is positioned the tubular member 28 retained therein by the diaphragm 9 which is threaded into the upper end of the objective 6. The lower end of the tubular member 28 positions one of the above described phase discs or plates 29. A different disc 29 may be inserted by removing the objective and then unscrewing the diaphragm 9 thereby releasing the tubular member 28. This arrangement of the microscope objective is described in the above mentioned application Serial No. 456,726.

Figure 4:
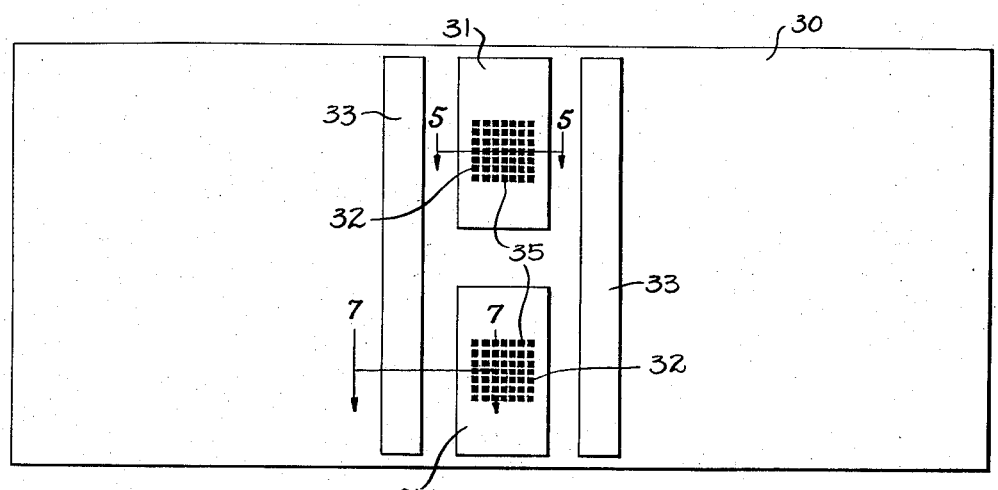
Fig. 4 is a top plan view of a microscope slide constructed according to the present invention.
Figure 5:
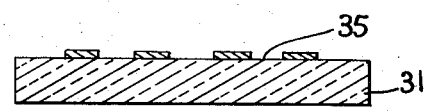
Fig. 5 is a fragmentary sectional view taken on line 5—5 of Fig. 4.
Figure 6:
Fig. 6 is a view similar to Fig. 5 showing another form of the invention.
Figure 7:
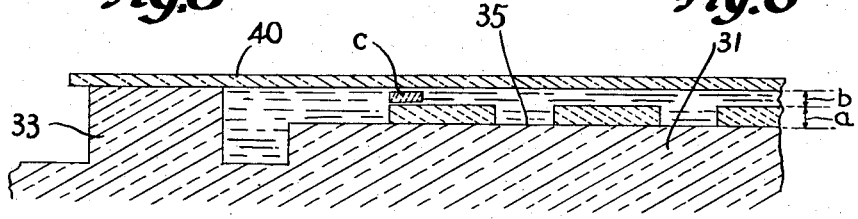
Figs. 7 and 8 are sectional views similar to Figs. 5 and 6 but showing the slide complete with cover plate and with a sample of material enclosed in each.
Figure 8:
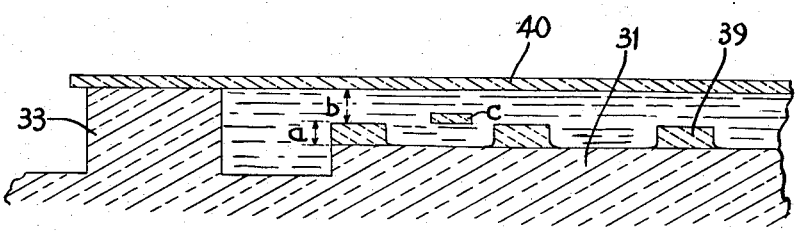

To illustrate the microscope slide such as a haemacytometer to which the present invention is directed, I have selected three forms of slides, one of which is shown in Figs. 4 and 5, another in Figs. 6 and 7, and the third in Fig. 8. In the form shown in Figs. 4 and 5, the slide comprises a base or body member 30 which is composed of transparent material such as glass and which has raised platforms 31, each having a ruled area 32. Adjacent the edges of the raised platforms 31 and spaced therefrom are the supports 33 for positioning a cover glass 40 in spaced relation with the platforms 31. Between the platforms 31 and the cover glass 40 is confined the specimen as clearly shown in Figs. 7 and 8.

In order that the specimen may be viewed against a ruled background, the areas 32 of the platforms 31 may be coated as indicated in Figs. 4 and 5, this coating being preferably of a di-electric material such as magnesium fluoride, quartz, cryolite, etc. For some purposes a metal such as aluminum may be employed as the coating material since this metal does to some extent impart a phase change. To form lines in the areas 32 corresponding portions thereof may be masked. The use of such a mask allows the coating material to form a deposit subdivided by the lines 35. Then again the entire areas 32 may be coated and the lines 35 cut into this coating by a ruling machine.

In the form of slide shown in Fig. 6, the lines are provided by forming depressions 37 in the surface of the areas 32. Such depressions may, for instance, be formed by etching. If this etching step results in the wrong phase difference between the cross lines and the adjacent surfaces 36 of the slide, the proper balance may be attained by coating in the above manner either the surfaces 36 or the depressed portions 37 depending on whether the difference in phase obtained by the etching step is too little or too great.

In the form of slide shown in Fig. 8, the coating material is applied only for the purpose of forming the lines 39, so that these lines extend above the surface of the slide; but are transparent and are practically invisible without the assistance of a "phase plate" in the microscope.

In all of the above mentioned forms of microscope slide, a difference in phase between the light transmitted by the cross lines and the light transmitted by the slide in general arises out of the difference between the two in optical path. This difference in optical path is determined by the thickness of coating, or in the form of slide shown in Fig. 6 by the depth of etch together with the thickness of the coating, if any. The essential feature for imparting contrast to these lines while the specimen is being observed is to relate this difference in phase to the optimum "phase plate" for observing the specimen which is to be studied.

While these "phase plates" generally combine absorption either of the deviated bundle of rays (type B) or the undeviated bundle of rays (type A), it is their phase difference characteristics which are here important. Where the optical path of the undeviated bundle of rays is increased by the "phase plate," it is known as an A plus or a B plus plate. Where the optical path of the deviated bundle is increased over the optical path of the undeviated bundle, it is known as an A minus or a B minus plate.

Assuming that the A type of plate is being used so that the plate affords to some extent absorption of the undeviated bundle of rays, the microscopist will require furthermore a range of phase difference between approximately a full wavelength plus to approximately a full wavelength minus. Somewhere in this range will be found a phase plate which affords by its difference in phase between the deviated bundle and the undeviated bundle the best conditions for observation, and if desired counting, of the particles or details of the specimen. By the selection of a proper phase plate, the particles can be made to appear dark in contrast to the background or can be made to appear light.

Once the phase plate has been determined upon, the cross lines of the microscope slide can be selected to stand out as bright lines or can be selected as dark lines depending upon the difference in optical path between the lines and the remainder of the slide.

Two examples of the application of these principles will assist in an understanding of the invention.

Referring to Fig. 7 of the drawing, it will be assumed that particles of average thickness $c$ are dispersed in a liquid whose general depth (between the slide 31 and cover glass 40) is $b$, and that the cross lines have been etched to a further depth $a$. If the index of refraction of the liquid is $n_1$, the index of refraction of the slide is $n_2$ and the index of refraction of the particle is $n_3$, we have the following relations:

$$an_2 + bn_1 - (a+b)n_1 = cn_3 + (b-c)n_1 - bn_1$$
$$an_2 + bn_1 - an_1 - bn_1 = cn_3 + bn_1 - cn_1 - bn_1$$
$$a(n_2 - n_1) = c(n_3 - n_1)$$
$$a = c \frac{n_3 - n_1}{n_2 - n_1}$$

Here the lines have opposite sign of path difference than the particle if $n_3 > n_1 < n_2$.

This means that when the particles appear bright, the lines appear dark and vice versa. If in the above equations we substitute the following values:

$c = .0013$ mm. thickness of quartz particle.

$n_3 = 1.548$ average index of quartz.

$n_1 = 1.333$ water.

$n_2 = 1.517$ glass.

$a = .0013 \frac{.215}{.184} = .0015$ mm. depth of groove.

the value obtained for $a$ is .0015 mm. which means that the lines are etched to a depth of .0015 mm. Since the optical path through the line can be increased or decreased by whole wave lengths, we can readily ascertain the steps by which such increase or decrease can take place. Referring to these steps as delta, we have $$\frac{\delta(n_2 - n_1)}{\lambda} = 1, 2, \text{etc.}$$

where $\lambda$ is the wave length of the light used. Thus $$\delta = \frac{\lambda}{n_2 - n_1}, \frac{2\lambda}{n_2 - n_1}, \text{etc.}$$

It may prove advantageous to use a ruling machine instead of an etching process to provide the lines as shown in Fig. 7. For instance, it may be desirable to apply a magnesium fluoride film upon the platforms 31 and then cut through this film by a ruling machine to form the lines.

In the former equation $$a = c \frac{n_3 - n_1}{n_2 - n_1}$$

the value for magnesium fluoride $n_2 = 1.380$ may be substituted to give as a value for $a$ the depth of groove equal to .0059 mm. It will be observed, therefore, that when a coating of low refractive index is used and the lines are cut therein, the depth of cut is greater than when the lines are etched into a glass plate.

Referring to Fig. 8 in which the lines are deposited on the platforms 31, here again the specimen is contained between the platforms 31 and the cover plate 40. Taking $a$ as the depth of coating of the cross lines, $b$ the distance from the top of such coating to the bottom of the cover plate and $c$ the average thickness of particle with the indices of refraction indicated as before, we have the following relations:

$$an_2 + bn_1 - (a+b)n = cn_3 + (b+a-c)n_1 - (b+a)n_1$$
$$an_2 + bn_1 - an_1 - bn_1 = cn_3 + bn_1 + an_1 - cn_1 - bn_1 - an_1$$
$$an_2 - an_1 = cn_3 - cn_1$$
$$a(n_2 - n_1) = c(n_3 - n_1)$$
$$a = c \frac{n_3 - n_1}{n_2 - n_1}$$

Here the lines have the same sign of path difference as the particles if $n_3 > n_1 < n_2$.

In general, therefore, the difference in optical path $\delta$ through the cross lines as compared with the slide 31 can be selected so as to cause the cross lines to appear either bright or dark when the particles are bright. Of course, when by an interchange of phase plates the particles are made to appear dark, the lines are reversed also. Moreover, a change in average particle thickness when introducing a new specimen or a different material into the microscope for observation will call for a different slide the thickness or depth of whose cross lines corresponds to this changed thickness of average particle.

It is to be understood that while I have discussed certain specific applications of my invention, and have selected certain forms of microscope slides in which my invention may be embodied, my invention may be otherwise embodied and practised within the scope of the following claims.

I claim:

1. A microscope slide for supporting fluid-suspended particles of relatively low contrast for counting purposes or the like at the object plane of a phase microscope, said slide being a plate-like element having a transparent region intermediate the ends thereof which is provided with an upper surface arranged to support said fluid-suspended particles thereon, said upper surface being formed by a plurality of first divisional portions and a plurality of second divisional portions interposed therebetween, said first divisional portions being in elevated relation and said second divisional portions being in recessed relation to each other so as to jointly form a pattern at said surface for facilitating said counting, the difference in thickness between said elevated portions and said recessed portions being controlled in accordance with the equation $$a = c\frac{n_3-n_1}{n_2-n_1} \pm \left(\frac{\lambda}{n_2-n_1}, \frac{2\lambda}{n_2-n_1}, \text{etc.}\right)$$

wherein $a$ is said difference in thickness, $c$ is approximately the average thickness of the particles to be counted, $n_1$ is the index of refraction of the suspension fluid, $n_2$ is the index of refraction of the material of the slide providing said difference in thickness, $n_3$ is the index of refraction of the material of which the particles to be counted are formed, and $\lambda$ is the average wavelength of the light being employed to illuminate said slide; whereby optical paths through said first and second divisional portions differing from each other by controlled amounts, in accordance with the thickness and optical properties of the particles to be counted and their suspension fluid, are provided in such a manner as to enable one of said plurality of portions to be viewed in a relatively bright contrast and the other of said plurality of portions to be viewed in a relatively dark contrast at the time said particles are being viewed in either dark or bright contrast in a phase microscope.

2. A microscope slide for supporting fluid-suspended particles of relatively low contrast for counting purposes or the like at the object plane of a phase microscope, said slide being a plate-like element having a transparent region intermediate the ends thereof which is provided with an upper surface arranged to support said fluid-suspended particles thereon, said upper surface being formed by a plurality of first divisional portions and a plurality of second divisional portions interposed therebetween, said first divisional portions being in elevated relation and said second divisional portions being in recessed relation to each other so as to jointly form a pattern at said surface for facilitating said counting, the difference in thickness between said elevated portions and said recessed portions being controlled in accordance with the equation.

$$a = c\frac{n_3-n_1}{n_2-n_1} \pm \left(\frac{\lambda}{n_2-n_1}, \frac{2\lambda}{n_2-n_1}, \text{etc.}\right)$$

wherein $a$ is said difference in thickness, $c$ is approximately the average thickness of the particles to be counted, $n_1$ is the index of refraction of the suspension fluid, $n_2$ is the index of refraction of the material of the slide providing said difference in thickness, $n_3$ is the index of refraction of the material of which the particles to be counted are formed, and $\lambda$ is the average wavelength of the light being employed to illuminate said slide, the material providing said difference in thickness being formed at least in part by a coating material of desired physical and optical properties applied to said slide at said region; whereby optical paths through said first and second divisional portions differing from each other by controlled amounts, in accordance with the thickness and optical properties of the particles to be counted and their suspension fluid, are provided in such a manner as to enable one of said plurality of portions to be viewed in a relatively bright contrast and the other of said plurality of portions to be viewed in a relatively dark contrast at the time said particles are being viewed in either dark or bright contrast in a phase microscope.

3. A microscope slide for supporting fluid-suspended particles of relatively low contrast for counting purposes or the like at the object plane of a phase microscope, said slide being a plate-like element having a transparent region intermediate the ends thereof which is provided with an upper surface arranged to support said fluid-suspended particles thereon, said upper surface being formed by a plurality of first divisional portions and a plurality of second divisional portions interposed therebetween, said first divisional portions being in elevated relation and said second divisional portions being in recessed relation to each other so as to jointly form a pattern at said surface for facilitating said counting, the difference in thickness between said elevated portions and said recessed portions being controlled in accordance with the equation $$a = c\frac{n_3-n_1}{n_2-n_1} \pm \left(\frac{\lambda}{n_2-n_1}, \frac{2\lambda}{n_2-n_1}, \text{etc.}\right)$$

wherein $a$ is said defference in thickness, $c$ is approximately the average thickness of the particles to be counted, $n_1$ is the index of refraction of the suspension fluid, $n_2$ is the index of refraction of the material of the slide providing said difference in thickness, and $n_3$ is the index of refraction of the material of which the particles to be counted are formed, and $\lambda$ is the average wavelength of the light being employed to illuminate said slide, the material providing said difference in thickness being homogeneous and integral with the material forming said region; whereby optical paths through said first and second divisional portions differing from each other by controlled amounts, in accordance with the thickness and optical properties of the particles to be counted and their suspension fluid, are provided in such a manner as to enable one of said plurality of portions to be viewed in a relatively bright contrast and the other of said plurality of portions to be viewed in a relatively dark contrast at the time said particles are being viewed in either dark or bright contrast in a phase microscope.

4. A microscope slide for supporting fluid-suspended particles of relatively low contrast for counting purposes or the like at the object plane of a phase microscope, said slide being a plate-like element having a transparent region intermediate the ends thereof which is provided with an upper surface arranged to support said fluid-suspended particles thereon, said upper surface being formed by a plurality of first divisional portions and a plurality of second divisional portions interposed therebetween, said first divisional portions being in elevated relation and said second divisional portions being in recessed relation to each other so as to jointly form a pattern at said surface for facilitating said counting, the difference in thickness between said elevated portions and said recessed portions being controlled in accordance with the equation $$a = c\frac{n_3-n_1}{n_2-n_1} \pm \left(\frac{\lambda}{n_2-n_1}, \frac{2\lambda}{n_2-n_1}, \text{etc.}\right)$$

wherein $a$ is said difference is thickness, $c$ is approximately the average thickness of the particles to be counted, $n_1$ is the index of refraction of the suspension fluid, $n_2$ is the index of refraction of the material of the slide providing said difference in thickness, $n_3$ is the index of refraction of the material of which the particles to be counted are formed, and $\lambda$ is the average wavelength of the light being employed to illuminate said slide, the material providing said difference in thickness being formed principally by a coating material of desired physical optical properties applied to said slide at said region; whereby optical paths through said first and second divisional portions differing from each other by controlled amounts, in accordance with the thickness and optical properties of the particles to be counted and their suspension fluid, are provided in such a manner as to enable one of said plurality of portions to be viewed in a relatively bright contrast and the other of said plurality of portions to be viewed in a relatively dark contrast at the time said particles are being viewed in either dark or bright contrast in a phase microscope.

ALVA H. BENNETT.

REFERENCES CITED

The following references are of record in the file of this patent:

UNITED STATES PATENTS

| Number | Name | Date |
|---|---|---|
| 353,325 | Palmer | Nov. 30, 1886 |
| 1,488,240 | Gulick | Mar. 25, 1924 |
| 1,647,865 | Hausser | Nov. 1, 1927 |
| 1,824,097 | Ott | Sept. 22, 1931 |
| 1,918,351 | Schulze | July 18, 1933 |
| 1,994,483 | Ott | Mar. 19, 1935 |
| 2,328,585 | Rooney | Sept. 7, 1943 |
| 2,399,799 | Guellich | May 7, 1946 |
| 2,427,689 | Osterberg et al. | Sept. 23, 1947 |

FOREIGN PATENTS

| Number | Country | Date |
|---|---|---|
| 636,168 | Germany | Oct. 7, 1936 |

OTHER REFERENCES

Zernike: "Phase Contrast" (Part II), article in Physica IX, No. 10, December 1942. Pages 974 to 986 inclusive. Published by M. Nijhoff, The Hague.